UNITED STATES PATENT OFFICE.

ARTHUR S. REEDER, OF KNOXVILLE, PENNSYLVANIA.

METHOD OF MAKING MOLDS.

1,166,934. Specification of Letters Patent. Patented Jan. 4, 1916.

No Drawing. Application filed August 17, 1915. Serial No. 45,949.

*To all whom it may concern:*

Be it known that I, ARTHUR S. REEDER, residing at Knoxville, in the county of Allegheny and State of Pennsylvania, a citizen of the United States, have invented or discovered a certain new and useful Improvement in Methods of Making Molds, of which improvement the following is a specification.

My invention relates to improvements in methods of making molds, and consists in a method of manufacture which produces molds for glass articles of superior character and quality.

The molds in which articles of glassware such as tumblers, bottles, jars, etc. are pressed or blown are formed of cast iron. Ordinarily these molds are two-part molds, hinged together, so that the articles when formed in them may the more readily be removed. In some cases the bottoms of the molds are made as separate parts. Such molds are made in a considerable range of sizes; the mold cavities are of all sorts of shapes; and the thickness of the mold walls is in many molds very unequal in different parts; and not infrequently the inner faces of the mold cavities are cut away irregularly to produce patterns of ornament and use in the finished article.

In the use of molds for pressing glass a mass of hot glass (which, when melted is at a temperature of about 2200° F.) is dropped into the mold and spread by a plunger, which constitutes the other mold part; in the use of blown-glass molds a hot body of glass is suspended in the mold cavity and blown into contact with the mold walls. In certain machines the articles are formed in the molds partly by pressing and partly by blowing.

The cast-iron mold itself is a green-sand casting, and, when it has been cast it is finished and prepared for service by being machined to the true shape and size desired. In use, these molds, very irregular in shape and in the distribution of the metal of which they are formed, and subjected to high and fluctuating temperature, often localized and concentrated at some particular point, lose the accurate shape initially given them; they become warped and distorted, and produce imperfect articles. When such misshaping advances beyond the point of producing passable articles the mold must be taken apart and worked over with a file or other instrument, and its deviations in shape must be corrected, so far as possible. Of course, such deviations in shape are undesirable and economically objectionable, and such work of correcting faults is time-consuming, expensive, and wholly undesirable. Furthermore, beyond a certain amount, the departure of a mold from its true and proper shape will render it unfit for service.

My invention resides in introducing into the method of manufacture of the mold itself a step which has the effect of curing or preventing the liability which I have described of the mold to warp while in service; and this is my invention: The mold, after it has been cast and before it is machined, is subjected to a heat treatment. It is taken from the sand in which it has been formed (either immediately, or at such time as is convenient) and placed in the chamber of a heating furnace. Its temperature is there gradually raised to a point where thermal expansion is arrested and as I believe internal strains relieved; this occurs when the article has reached a bright red heat, at a temperature of about 1400°–1450° F. and when raised to such a degree is maintained at substantially that degree for a considerable time, preferably about eight hours. The fire in the furnace is then extinguished and the mold within allowed to cool gradually to or substantially to atmospheric temperature. This heat treatment just described is preferably, though not necessarily, repeated a second, and it may be repeated even a third time. When the mold has been subjected to this heat treatment and is cool again, it is taken and machined in the usual manner in preparation for its intended use. Such a mold, so treated in the course of its manufacture, is not liable to such distortion and misshaping in service as the mold of ordinary manufacture experiences; it is far more durable, far less costly in maintenance, and produces uniformly satisfactory articles.

In some cases it will be found desirable to take the mold in its initial condition after being cast, and first heat it and then suddenly cool or quench it, and thereafter subject it to the gradually increased and gradually diminished temperature treatment which I have described above, repeated if desired. Such a preliminary heating and quenching operation consolidates the metal and improves its texture for the purpose intended. Of course my method in this and in other respects does not exclude the adoption and use at the same time of such other expedients, methods, and variations as the particular quality of the iron under treatment may require, or the wisdom and experience of the operator may suggest.

I claim as my invention:

1. The method herein described of making cast iron molds which consists in casting the mold, subjecting the mold when cast to a strain-relieving temperature, gradually attained and gradually diminished, and finally, after it has been so formed and treated, shaping the mold minutely for its intended use.

2. The method herein described of making cast-iron molds which consists in casting the mold, subjecting the mold repeatedly when cast to a strain-relieving temperature gradually attained and gradually diminished, and finally, after it has been so formed and treated, shaping the mold minutely for its intended use.

3. The method herein described of making cast-iron molds which consists in casting the mold, subjecting the mold when cast to a minimum temperature of 1400° F., gradually attained and gradually diminished, and finally, after it has been so treated, shaping the mold minutely for its intended use.

In testimony whereof I have hereunto set my hand.

ARTHUR S. REEDER.

Witnesses:
BAYARD H. CHRISTY,
GEO. B. BLEMING.

Copies of this patent may be obtained for five cents each, by addressing the "Commissioner of Patents, Washington, D. C."